Aug. 18, 1970  J. CERMAK  3,524,773

HEAT FLOW SENSOR COMPRISING THERMOCOUPLES

Filed Aug. 3, 1965

INVENTOR
JIRI CERMAK

BY
ATTORNEY 3,524,773
HEAT FLOW SENSOR COMPRISING
THERMOCOUPLES
Jiri Cermak, Prague, Czechoslovakia, assignor to Cesko-
slovenska akademie ved, Prague, Czechoslovakia
Filed Aug. 3, 1965, Ser. No. 476,943
Claims priority, application Czechoslovakia,
Aug. 6, 1964, 4,480/64
Int. Cl. H01v 1/00, 1/04
U.S. Cl. 136—224                          3 Claims

ABSTRACT OF THE DISCLOSURE

A thermal sensor and a method of making the same. A body of ceramic material of disc shape has two major surfaces one of which is provided with a grid of projecting ribs which subdivided it into a plurality of individual facets. The body is formed with a plurality of passages extending from the one to the other surface, two passages being located within the confines of each facet. A thermocouple is located on each facet with its terminals extending through the associated passages to the other major surface. At the other major surface the terminals of all thermocouples are connected in series. These connected terminals and the other major surface are covered with a waterproof coating. The one major surface and the thermocouples thereon, as well as the projecting grids, are covered with a coating of metallic material.

---

Heat flow sensors utilizing thermocouples are designed so that they consist of a tubular body, in one frontal side of which is inserted a unit of ceramic material with thermocouples, said unit having e.g. the shape of a disc. The hot side connections of the thermocouple are either on the input surface or are hidden under the input surface of the unit. By input surface is understood the side that gets in contact with the flow measured. From the reverse side, i.e. from the output side, penetrate those terminals of the thermocouples which are joined in cold connection, the constant temperature of the said cold connection being maintained by boiling cooling liquid, i.e. by boiling water, closed in the tubular body. The other frontal side of the tube is closed by a cover through which penetrate the terminals from the thermocouple battery to the measuring instrument. The temperature inside the sensor tube being constant, the change of intensity of heat flow streaming onto the input surface will manifest itself in the change of the thermocouple battery voltage.

The basic functional element of the sensor is a unit comprising thermocouples. The mass of this unit, its outside shape and surface finish have not, up to now, been exactly defined. In view of this fact resistance to cracking as a result of quick temperature changes, to withstand soaking and abrasion has not been fully attained in such units. Besides, the strength of these units can still be increased and the high frequency noise, caused by quick fluctuation of heat flow, reduced.

These drawbacks are removed by the unit utilizing thermocouples according to this invention. The principle of the manufacturing method consists in providing ribs and openings in fields on the input surface of the unit, whereafter in the said openings there are inserted the thermocouple terminals, which then are cemented to the surface of the field, whereafter behind the output surface of the unit the thermocouple terminals are connected in series and cemented in the openings. Then a waterproof coating is applied onto the output surface and a metal coating onto the input surface, whereafter the metal coating is removed from the tops of the ribs and the unit is set tightly into a metal ring.

The principle of the novel sensor unit utilizing thermocouples resides in that the unit of ceramic material has on its input surface ribs which form in all fields, with openings in which thermocouples are cemented, and that the output surface, excepting the rib tops, is coated with a metal coating which the input surface is coated with a water-proof coating.

The advantage of a unit designed and finished as described lies in its increased resistance to sudden temperature changes and to soaking and abrasion and, also, in its increased strength and reduced high frequency noise.

An exemplary embodiment of a unit is shown in FIGS. 1 to 4.

Figure 1:
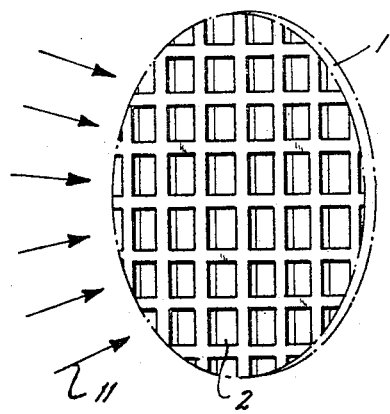
Figure 2:
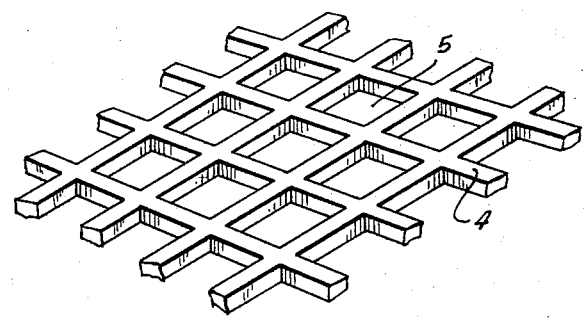
Figure 3:
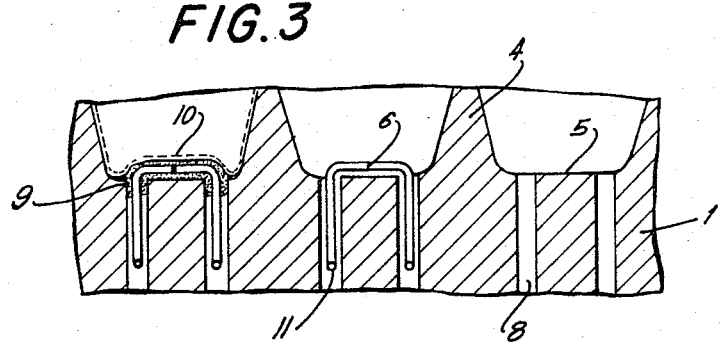
Figure 4:
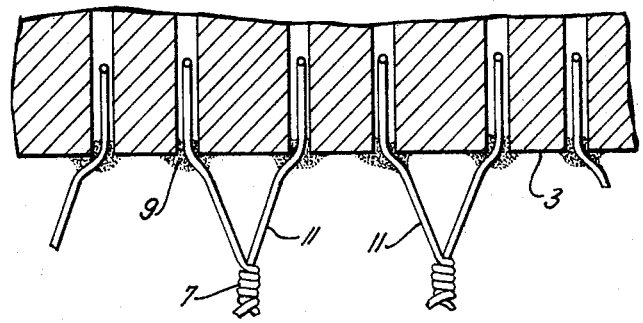

FIG. 1 is a total view of the disc of a unit, the ribbed input surface of which is in contact with heat flow. FIG. 2 shows a detail of the ribbed input surface. FIG. 3 shows a section through the input surface with thermocouples cemented and metal coated, and FIG. 4 is a section through the input surface showing the thermocouple terminals.

The unit 1 can have various shapes, e.g. the shape of a disc of baked, but not cemented ceramic material, whereby there is attained an increased resistance to sudden temperature changes. The input surface 2, upon which the heat flow is to be measured impinges, is during production provided with protruding ribs 4, forming on this surface various shapes, e.g. small, parallelogram-shaped fields 5, outlined by the ribs 4. Ribs 4 may be of various profiles, e.g. of a conical profile and, increase the strength of the unit 1. Thermocouples are cemented to the field surfaces of fields 5 by putty 9, based e.g. on a mixture of ethylsilicate with methyl-ethoxy-siloxane and a filler. Either the complete thermocouples, or only their terminals 11, may be cemented in openings 8 provided for this purpose in the unit 1. The cemented thermocouples, the surface of fields 5 and the ribs 4 are then coated with metal, e.g. with non-oxydizable steel or aluminum, e.g. by shot blasting. Thereby the strength and the resistance of the unit to abrasion are increased. This metal coating 10 acts, at the same time, as a filter retaining very fast components in the unsteady output signal. The filtration of high frequency noise is influenced both by the thickness of metal coating 10 and by the thickness of putty 9, in cases where the entire thermocouple 9 is covered by putty on the input surface 2. In this case it is also possible, but not necessary, to remove the metal coating 10 from the tops of ribs 4. If the thermocouples are cemented on the input surface 2 only in such a manner that a part of their surface remains uncovered, the metal coating 10 must necessarily be removed from the tops of ribs 4 to prevent a conductive connection of all thermocouples through the metal coating 10. The thermocouple terminals 11 pass through two openings 8 of unit 1 and come out through output surface 3 where they join in cold connection 7 in series with terminals 11 of the neighbouring thermocouples. Terminals 11 are cemented into openings 8 of the output surface 3 by putty 9. The water resistance of output surface 3 and its resistance against soaking are assured by providing a silicone or equal coating. A metal ring surrounds and engages the peripheral marginal portion of the unit 1 and serves to reinforce the unit 1 as well as serving as a packing at the insertion of the unit 1 into the tubular body of sensor.

A sensor with a unit according to this invention can be used for sensing heat radiation appearing in all heat industrial processes, mainly those occurring above 1200° K., especially for the purposes of automating these processes by means of continuous—analogue or digital— regulating circuits. Moreover, in view of its high sensitivity, the sensor is destined especially for application in furnaces with a high rate of combustion of granulating boilers to continuously check the heat condition and to facilitate the attendance.

The sensor not only replaces the unsatisfactory optical pyrometers of narrow angle radiation that do not offer a correct picture of the combustion process, it simultaneously takes over the function of guards for the burners, with a minimum delay in supplying information as to the operational failure of any of the burners, or of the changes in the quality or heating value of fuel. It shows the influence of change of combustion air supply upon the operation of the furnace. By using several sensors it is possible to easily judge the character of movement of heat fields—of flame cores, it is, therefore, indirectly possible to replace the application of industrial television.

Some further possibilities of application of this sensor are in the metallurgical industry for various types of smelter furnaces, and after a special adaptation for continuous checking of the temperature of melt, e.g. also of slag. The sensor can easily be adapted also for the purposes of ceramics manufacturing, for automatic control of rotary kilns for production of lime, cement, etc., and in the chemical industry for checking heat conditions in various mediums without deleterious effects.

What I claim is:

1. A thermal sensor comprising, in combination, a body of inert material having a first surface which in use of the unit is exposed to heat flow, and a second surface, said first surface being provided with a plurality of intersecting raised ribs subdividing said first surface into a plurality of facets and having respective faces facing away from said first surface; a plurality of thermocouples, each secured to one of said facets and having a pair of terminals extending through said body from said first to said second surface, said terminals of said thermocouples being connected in series at said second surface; a coating of metallic material on said first surface, said thermocouples and said ribs except for said faces of the latter; and a coating of waterproof material covering said second surface.

2. A sensor as defined in claim 1, wherein said inert material is a ceramic material.

3. A sensor as defined in claim 2, wherein said body is provided with a plurality of apertures extending from said first to said second surface, said apertures being provided in pairs each aperture of which extends inwardly of said first surface within the outline of one of said facets, said terminals of said thermocouples extending through the respective apertures and being connected at said second surface.

References Cited

UNITED STATES PATENTS 1,098,472   6/1914   Bristol _____ 73—341

WINSTON A. DOUGLAS, Primary Examiner

M. J. ANDREWS, Assistant Examiner

U.S. Cl. X.R.

136—233